US012679359B2

(12) United States Patent
Wang

(10) Patent No.: US 12,679,359 B2
(45) Date of Patent: Jul. 14, 2026

(54) LANE DEPARTURE SUPPRESSION DEVICE, LANE DEPARTURE SUPPRESSION METHOD, AND NON-TRANSITORY STORAGE MEDIUM

(71) Applicant: TOYOTA JIDOSHA KABUSHIKI KAISHA, Toyota (JP)

(72) Inventor: Chenyu Wang, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 22 days.

(21) Appl. No.: 19/033,826

(22) Filed: Jan. 22, 2025

(65) Prior Publication Data

US 2025/0242806 A1 Jul. 31, 2025

(30) Foreign Application Priority Data

Jan. 29, 2024 (JP) ................................. 2024-011201

(51) Int. Cl.
*B60W 30/12* (2020.01)
*B60W 10/20* (2006.01)
*B60W 40/072* (2012.01)

(52) U.S. Cl.
CPC ............ *B60W 30/12* (2013.01); *B60W 10/20* (2013.01); *B60W 40/072* (2013.01); *B60W 2420/403* (2013.01); *B60W 2520/06* (2013.01); *B60W 2520/12* (2013.01)

(58) Field of Classification Search
CPC ........... B60W 10/20; B60W 2420/403; B60W 2520/06; B60W 2520/12; B60W 30/12; B60W 30/18163; B60W 40/072
See application file for complete search history.

(56) References Cited

U.S. PATENT DOCUMENTS

| | | |
|---|---|---|
| 7,692,534 B2 | 4/2010 | Kataoka et al. |
| 8,352,124 B2 | 1/2013 | Taguchi |
| 8,682,500 B2 | 3/2014 | Sakugawa |
| 8,818,634 B2 | 8/2014 | Fujita et al. |
| 9,168,953 B2 | 10/2015 | Mitsumoto et al. |
| 9,714,034 B2 | 7/2017 | Otake et al. |
| 9,880,558 B2 | 1/2018 | Nakamura |

(Continued)

FOREIGN PATENT DOCUMENTS

JP 2007-210412 A 8/2007

*Primary Examiner* — Adam R Mott
*Assistant Examiner* — Abigail Lee Espinoza
(74) *Attorney, Agent, or Firm* — Sughrue Mion, PLLC

(57) ABSTRACT

A processor of a lane departure suppression device starts lane departure suppression processing of controlling a host vehicle such that departure of the host vehicle from a lane is suppressed when a first condition for determining whether or not there is a high possibility that the host vehicle departs from one end in a width direction of the lane to an outside of the lane based on information acquired by an in-vehicle sensor is satisfied, and then terminates execution of the lane departure suppression processing when a predetermined second condition is satisfied. The processor sets the second condition based on information about a traveling environment such that re-departure of the host vehicle from the lane due to an influence of the traveling environment within a predetermined period of time after the lane departure suppression processing is terminated.

5 Claims, 6 Drawing Sheets

(56) References Cited

U.S. PATENT DOCUMENTS

| | | | |
|---|---|---|---|
| 9,902,399 B2 | 2/2018 | Torii et al. | |
| 10,345,443 B2 | 7/2019 | Masui et al. | |
| 10,611,240 B2 | 4/2020 | Masui et al. | |
| 2007/0255474 A1* | 11/2007 | Hayakawa | B60T 8/17557 |
| | | | 701/70 |

* cited by examiner

LANE DEPARTURE SUPPRESSION DEVICE, LANE DEPARTURE SUPPRESSION METHOD, AND NON-TRANSITORY STORAGE MEDIUM

CROSS-REFERENCE TO RELATED APPLICATION

This application claims priority to Japanese Patent Application No. 2024-011201 filed on Jan. 29, 2024. The disclosure of the above-identified application, including the specification, drawings, and claims, is incorporated by reference herein in its entirety.

BACKGROUND

1. Technical Field

The present disclosure relates to a lane departure suppression device, a lane departure suppression method, and a non-transitory storage medium that suppresses departure of a host vehicle from a lane in which the host vehicle is traveling.

2. Description of Related Art

A lane departure suppression device that suppresses departure of a host vehicle from a lane in which the host vehicle is traveling has been proposed (for example, see Japanese Unexamined Patent Application Publication No. 2007-210412 (JP 2007-210412 A)). A processor of the lane departure suppression device (hereinafter, referred to as "related-art device") according to JP 2007-210412 A executes lane departure suppression processing of controlling the host vehicle (drive device and/or brake device of each wheel) such that the host vehicle returns to an original lane when the host vehicle enters a shoulder from the lane in which the host vehicle is traveling (when the host vehicle departs from the lane).

SUMMARY

As described above, in the related art, the processor of the related-art device executes the lane departure suppression processing, and thus the host vehicle moves toward a center side in a width direction of the original lane. Here, for example, in a situation where a width of the lane is relatively small, when the lane departure suppression processing is terminated in a state where the host vehicle is moving from a left end side of the lane toward the center side of the lane by the lane departure suppression processing, there is a risk that the host vehicle re-departs from a right end (end portion on an opposite side from the previous time) of the lane immediately after the termination of the lane departure suppression processing. In addition, immediately after the lane departure suppression processing is terminated, there is a risk that the host vehicle re-departs from the lane due to an influence of a cant of the lane or a crosswind. As described above, there is a possibility that the host vehicle re-departs from the lane due to the influence of a traveling environment of the host vehicle (in a short period of time) immediately after the processor terminates the lane departure suppression processing. The related-art device does not include a unit that suppresses such re-departure.

An object of the present disclosure is to provide a lane departure suppression device capable of suppressing re-departure of a host vehicle from a lane due to an influence of a traveling environment immediately after control of suppressing departure of the host vehicle from the lane is terminated.

In order to achieve the above-described object, an aspect of the present disclosure relates to a lane departure suppression device (1) including: an in-vehicle sensor (20) configured to acquire information about a traveling environment (W, C) of a host vehicle (V) and information about a lateral position and a lateral speed of the host vehicle in a lane (L1) in which the host vehicle is traveling; and a processor (10) configured to start lane departure suppression processing (P1, P2) of controlling the host vehicle such that departure of the host vehicle from the lane is suppressed when a first condition for determining whether or not there is a high possibility that the host vehicle departs from one end in a width direction of the lane to an outside of the lane based on the information acquired by the in-vehicle sensor is satisfied, and then terminate execution of the lane departure suppression processing when a predetermined second condition is satisfied.

The processor is configured to set the second condition based on the information about the traveling environment such that re-departure of the host vehicle from the lane due to an influence of the traveling environment within a predetermined period of time after the lane departure suppression processing is terminated in a state where the host vehicle is moving toward a center side in the width direction of the lane due to the execution of the lane departure suppression processing is suppressed.

Another aspect of the present disclosure relates to a lane departure suppression method including: acquiring information about a traveling environment of a host vehicle and information about a lateral position and a lateral speed of the host vehicle in a lane in which the host vehicle is traveling; and executing vehicle control to start lane departure suppression processing of controlling the host vehicle such that departure of the host vehicle from the lane is suppressed when a first condition for determining whether or not there is a high possibility that the host vehicle departs from one end in a width direction of the lane to an outside of the lane based on the information acquired in the acquiring of the information is satisfied, and then terminate execution of the lane departure suppression processing when a predetermined second condition is satisfied.

The executing of the vehicle control includes setting the second condition based on the information about the traveling environment such that re-departure of the host vehicle from the lane due to an influence of the traveling environment within a predetermined period of time after the lane departure suppression processing is terminated in a state where the host vehicle is moving toward a center side in the width direction of the lane due to the execution of the lane departure suppression processing is suppressed.

Still another aspect of the present disclosure relates to a non-transitory storage medium storing a lane departure suppression program causing a computer provided in a host vehicle to execute: acquiring information about a traveling environment of the host vehicle and information about a lateral position and a lateral speed of the host vehicle in a lane in which the host vehicle is traveling; and executing vehicle control to start lane departure suppression processing of controlling the host vehicle such that departure of the host vehicle from the lane is suppressed when a first condition for determining whether or not there is a high possibility that the host vehicle departs from one end in a width direction of the lane to an outside of the lane based on the information acquired in the acquiring of the information is satisfied, and then terminate execution of the lane departure suppression processing when a predetermined second condition is satisfied.

The executing of the vehicle control includes setting the second condition based on the information about the traveling environment such that re-departure of the host vehicle from the lane due to an influence of the traveling environment within a predetermined period of time after the lane departure suppression processing is terminated in a state where the host vehicle is moving toward a center side in the width direction of the lane due to the execution of the lane departure suppression processing is suppressed.

The processor of the lane departure suppression device according to the aspect of the present disclosure executes lane departure suppression processing of suppressing the departure when there is a high possibility that the host vehicle departs from the lane (when the first condition is satisfied). As a result, the host vehicle starts to move toward the center side in the width direction of the lane. Then, the processor terminates the lane departure suppression processing when a predetermined termination condition is satisfied (when the second condition is satisfied). Here, there is a possibility that the host vehicle departs (re-departs) from the lane from one end or the other end of the lane due to the influence of the traveling environment (for example, the width of the lane, the cant, or the crosswind) within the predetermined period of time (short period of time) after the lane departure suppression processing is terminated. According to the aspect of the present disclosure, the second condition is set in accordance with the traveling environment. As a result, the re-departure as described above is suppressed.

In the lane departure suppression device according to the aspect of the present disclosure, the second condition may be satisfied in a case where the lateral speed (vy) of the host vehicle when the host vehicle moves toward the center side of the lane exceeds a predetermined target value (vyd), the information about the traveling environment may include information about a width (W) of the lane, and the processor may be configured to assign a smaller value to the target value as the width of the lane is smaller.

When the lane departure suppression processing is terminated in a state where the host vehicle is moving from one end side of the lane toward the center side and the lateral speed of the host vehicle is relatively large in a situation where the width of the lane is relatively small, there is a high possibility that the host vehicle departs from the lane from the other end of the lane. With the lane departure suppression device according to the aspect, the target value of the lateral speed (condition for terminating the lane departure suppression processing (second condition)) is set in accordance with the width of the lane, so that the departure of the host vehicle from the lane from the other end of the lane immediately after the control of suppressing the departure of the host vehicle from the lane from one end of the lane is terminated is suppressed.

In the lane departure suppression device according to the aspect of the present disclosure, the information about the traveling environment may include information about a cant (C) of the lane; and the processor may be configured to add a larger correction value to the target value as a height difference when one end side of the lane is lower than the other end side of the lane is larger, and subtract a larger value from the target value as a height difference when the one end side of the lane is higher than the other end side of the lane is larger.

In a case where one end side (other end side) of the lane is lower than the other end side (one end side) of the lane, the host vehicle is likely to move toward one end side (other end side) of the lane due to the influence of the gravity (lateral component of gravitational acceleration) acting in the lateral direction caused by the inclination. Therefore, the host vehicle is likely to depart from the lane from one end (other end) of the lane. According to the aspect, the target value of the lateral speed is corrected in accordance with the magnitude of the cant (height difference), so that the departure of the host vehicle from the lane is suppressed due to the cant immediately after the lane departure suppression processing is terminated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Outline

Figure 1:
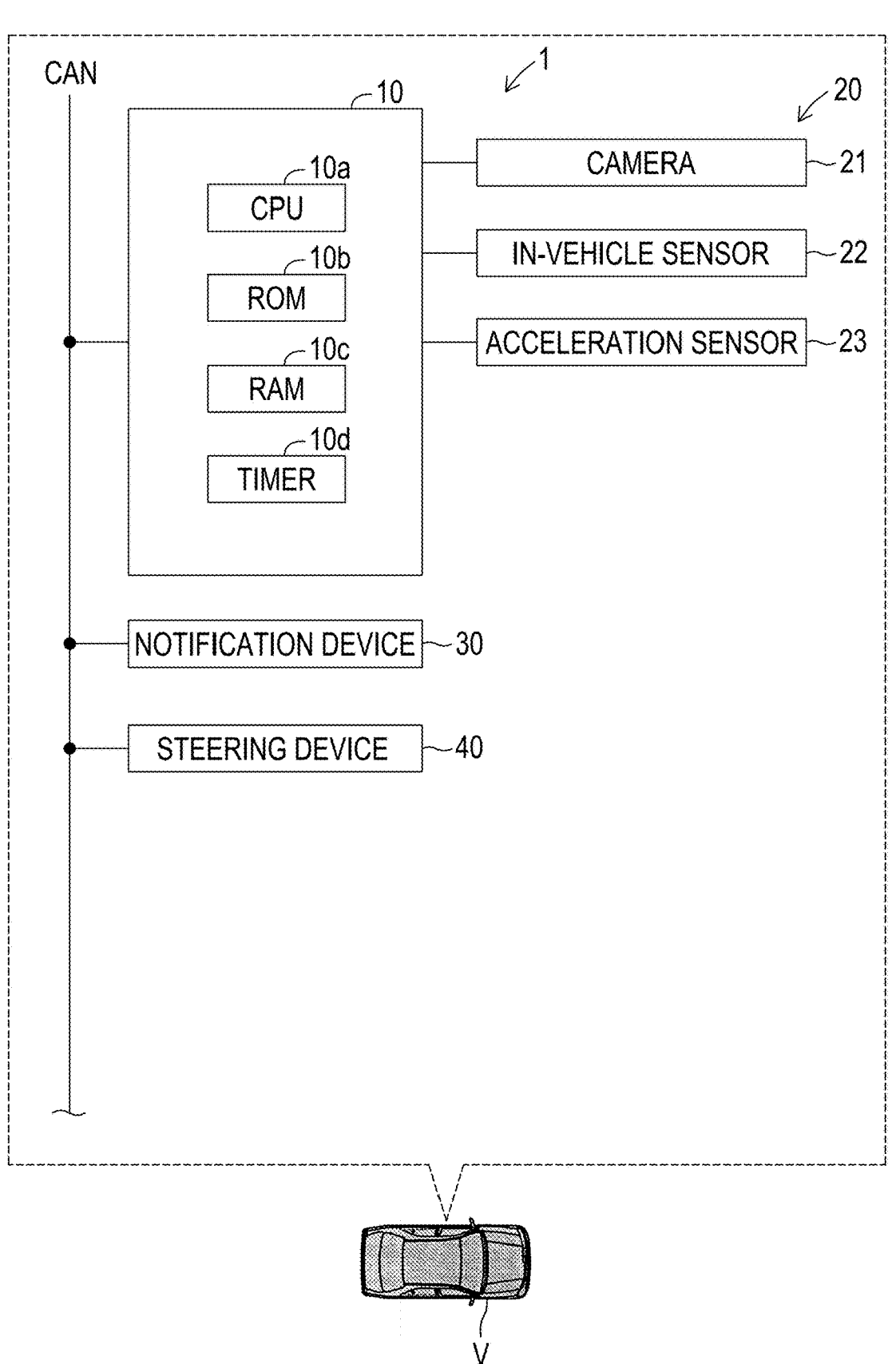
FIG. 1 is a block diagram of a lane departure suppression device according to an embodiment of the present disclosure.

As shown in FIG. 1, a lane departure suppression device 1 according to an embodiment of the present disclosure is applied to a vehicle V (hereinafter, referred to as "host vehicle") having an autonomous driving function. The lane departure suppression device 1 has a lane departure suppression function of controlling the host vehicle (notification device 30 and steering device 40 described below) such that the departure of the host vehicle from a lane in which the host vehicle is traveling in a state where the autonomous driving function is inactivated is suppressed.

Specific Configuration

As shown in FIG. 1, the lane departure suppression device 1 includes an ECU 10, an in-vehicle sensor 20, a notification device 30, and a steering device 40.

The ECU 10 includes a microcomputer including a CPU 10*a*, a ROM 10*b* (rewritable non-volatile memory), a RAM 10*c*, a timer 10*d*, and the like. The CPU executes a program (instruction) stored in the ROM, to realize various functions. The ECU 10 is connected to another ECU via a controller area network (CAN). The memory is an example of a storage medium.

The in-vehicle sensor 20 includes a camera 21, a vehicle speed sensor 22, and an acceleration sensor 23.

The camera 21 includes an imaging device. The imaging device includes, for example, a CCD built therein. The imaging device is installed in a front portion of the host vehicle, and the imaging device is directed forward of the host vehicle. The imaging device images a front region of the host vehicle at a predetermined frame rate to acquire image data. The camera 21 further includes an image analysis device. The image analysis device acquires the image data from the imaging device, analyzes the image data, and recognizes (identifies) a target present within a field of view. The image analysis device recognizes, for example, lane markings BR, BL of a lane L1 in which the host vehicle is traveling. The image analysis device acquires a shape of the lane markings BR, BL (curvature of the lane L1) and an interval between the lane markings BR, BL (width W of the lane L1) as lane marking information. The image analysis device acquires a lateral position of the center of gravity G (distance between the center of gravity G and the lane marking BR and distance between the center of gravity G and the lane marking BL) of the host vehicle in the lane L1 as position information based on positions (coordinates) of the lane markings BR, BL in the field of view of the imaging device. The image analysis device provides the lane marking information and the position information to the ECU 10.

The vehicle speed sensor 22 acquires a speed vs (forward speed (absolute value) with respect to the lane L1) of the host vehicle based on a rotation speed of wheels per unit time. Then, the vehicle speed sensor 22 provides the acquired speed vs to the ECU 10.

The acceleration sensor 23 includes a piezoelectric element. When the host vehicle is accelerated (or decelerated) in a front-rear direction and a width direction, the piezoelectric element is deformed in the front-rear direction of the host vehicle and the width direction of the host vehicle, and an output voltage of the piezoelectric element is changed due to the deformation. The acceleration sensor 23 acquires the acceleration in a longitudinal direction and the acceleration in a lateral direction of the host vehicle based on the output voltage of the piezoelectric element. The acceleration sensor 23 provides these kinds of the acceleration to the ECU 10. In a state where the host vehicle is stopped or in a state where the host vehicle is traveling straight at a constant speed, the output (acceleration information) of the acceleration sensor 23 indicates the gravitational acceleration. That is, an inclination angle (gradient) of a road surface can be calculated based on the output of the acceleration sensor 23. When the host vehicle is accelerated (decelerated) or turned, the inclination angle (gradient) of the road surface can be calculated based on the acceleration information obtained by removing an influence of the behavior of the host vehicle on the output of the acceleration sensor 23.

The notification device 30 includes an image display device and an audio device. The image display device is disposed, for example, on an instrument panel (near a speed display device). The image display device displays an image in accordance with a command acquired from the ECU 10.

The audio device reproduces sound in accordance with the command acquired from the ECU 10.

The steering device 40 adjusts a steering angle of steered wheels (right front wheel and left front wheel). The steering device 40 includes a steering ECU and a steering mechanism. The steering device 40 further includes an actuator (for example, an electric motor) that drives the steering mechanism to change the steering angle and a steering angle sensor that acquires a steering angle φ (actual steering angle) of the steered wheels. The ECU 10 decides a target value φd of the steering angle φ (actual steering angle) of the steered wheels based on various kinds of information acquired from the in-vehicle sensor 20. The steering angle φ in a state where the host vehicle is traveling straight is "0 (deg)". The steering angle φ in a state where the host vehicle makes a right turn is positive (>0), and the steering angle φ in a state where the host vehicle makes a left turn is negative (<0). For example, the ECU 10 increases the target value φd when a steering wheel is rotated in a right direction, and decreases the target value φd when the steering wheel is rotated in a left direction. In a case where there is a high possibility that the host vehicle departs from the lane L1, the ECU 10 decides the target value φd such that the host vehicle moves toward the center side in the width direction of the lane L1. The steering ECU acquires the target value φd from the ECU 10 and controls the actuator such that the steering angle φ output from the steering angle sensor matches the target value φd.

Operation

As described below, the ECU 10 executes lane departure suppression processing (hereinafter, referred to as "LDA processing") in a case where there is a high possibility that the host vehicle departs from the lane L1.

LDA Processing

The ECU 10 sequentially acquires various kinds of information from the in-vehicle sensor 20 at a predetermined cycle when an ignition switch is in an on state. Specifically, the ECU 10 acquires the lane marking information and the position information from the camera 21 (image analysis device). In addition, the ECU 10 acquires the speed vs from the vehicle speed sensor 22. The ECU 10 acquires the steering angle φ (actual steering angle) from the steering ECU. The ECU 10 calculates a predicted trajectory PT of the host vehicle in the lane L1 (for example, the center of gravity G of the host vehicle or a trajectory of an outer peripheral portion of the host vehicle) based on these kinds of information, and acquires a point X at which the predicted trajectory PT and the lane marking BR or the lane marking BL intersect each other. The ECU 10 calculates time ΔT for the center of gravity G (or the outer peripheral portion of the host vehicle) to reach (intersect) the point X. In the present embodiment, when the time ΔT is equal to or smaller than a threshold value ΔTth, the host vehicle is considered to be in a state where there is a high possibility that the host vehicle departs from the lane L1. The ECU 10 executes alert processing P1 and automatic steering processing P2 described below, as the LDA processing when the time ΔT is equal to or smaller than the threshold value ΔTth (when a start condition (first condition according to the embodiment of the present disclosure) of the LDA processing is satisfied).

Alert Processing P1

The ECU 10 transmits a predetermined alert command to the notification device 30 to notify a driver that there is a high possibility that the host vehicle departs from the lane L1. The image display device of the notification device 30 displays an image (icon) corresponding to the alert command. In addition, the audio device of the notification device 30 reproduces sound (beep sound) corresponding to the alert command.

Automatic Steering Processing P2

Figures 2A, 2B, 2C:
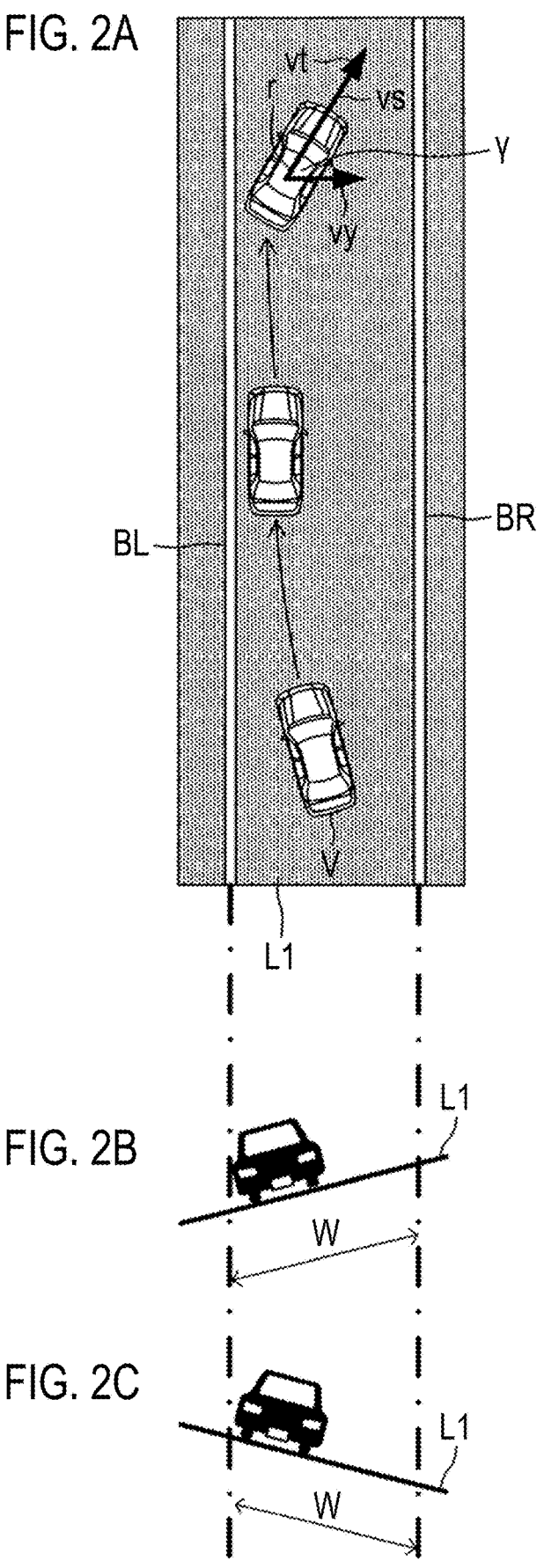
FIG. 2A is a plan view showing a situation where departure of a host vehicle from a left end of a lane is suppressed.
FIG. 2B is a plan view showing a situation where the departure of the host vehicle from the left end of the lane is suppressed.
FIG. 2C is a plan view showing a situation where the departure of the host vehicle from the left end of the lane is suppressed.
Figures 3A, 3B, 3C:
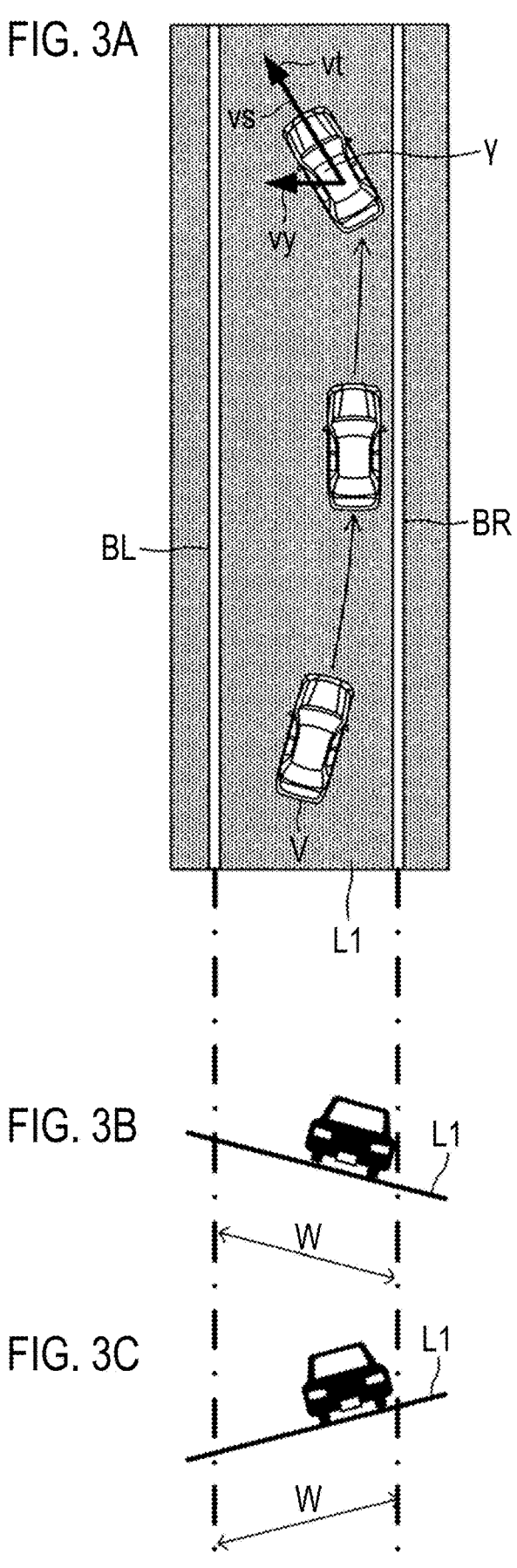
FIG. 3A is a plan view showing a situation where the departure of the host vehicle from a right end of the lane is suppressed by a lane departure suppression function.
FIG. 3B is a plan view showing a situation where the departure of the host vehicle from the right end of the lane is suppressed by the lane departure suppression function.
FIG. 3C is a plan view showing a situation where the departure of the host vehicle from a right end of the lane is suppressed by the lane departure suppression function.

The ECU 10 transmits, to the steering ECU, a steering command (target value of the steering angle) in accordance with a direction of the predicted trajectory PT with respect to the lane L1. Specifically, in a case where the predicted trajectory PT intersects the lane marking BL (first situation (FIGS. 2A, 2B, and 2C)), the ECU 10 sets the target value φd such that the host vehicle makes a right turn (such that the steering angle φ is increased) and transmits the target value φd to the steering ECU. On the other hand, in a case where the predicted trajectory PT intersects the lane marking BR (second situation (FIGS. 3A, 3B, and 3C)), the ECU 10 sets the target value φd such that the host vehicle makes a left turn (such that the steering angle φ is decreased) and transmits the target value φd to the steering ECU.

The target values φd are, for example, fixed values decided in advance. For example, in the first situation, a value obtained by adding a predetermined value α (deg) to the current target value φd may be adopted as a new target value φd, and in the second situation, a value obtained by subtracting the predetermined value α (deg) from the current target value φd may be adopted as a new target value φd.

In addition, a value in accordance with the time ΔT may be assigned to the target value φd. For example, a map in which a relationship between the time ΔT and the target value φd is defined is stored in the ROM 10*b*, and the ECU 10 decides the target value φd by referring to the map. In the first situation, the target value φd corresponding to a time ΔT1 is "+α1 (deg)", and the target value φd corresponding to a time ΔT2 longer than the time ΔT1 is "+α2 (deg)" smaller than "+α1 (deg)". In the second situation, the target value φd corresponding to the time ΔT1 is "−α1 (deg)", and the target value φd corresponding to the time ΔT2 longer than the time ΔT1 is "−α2 (deg)" larger than "−α1 (deg)".

For example, a value in accordance with an angle β between a tangent line of the predicted trajectory PT at the point X at which the predicted trajectory PT and the lane marking BL (BR) intersect each other and a tangent line of the lane marking BL (BR) at the point X may be assigned to the target value φd. In this case, in the first situation, a larger value (>0) may be assigned to the target value φd as the absolute value of the angle β is larger. In addition, in the second situation, a smaller value (<0) is assigned to the target value φd as the absolute value of the angle β is larger.

When there is a high possibility that the host vehicle departs from the lane L1, the LDA processing (alert processing P1 and automatic steering processing P2) is executed, whereby the host vehicle starts to move toward the center side in the width direction of the lane L1. In other words, a component (lateral speed vy) of a speed vector vt of the host vehicle, which is directed to the center side in the width direction of the lane L1, starts to be increased. The ECU 10 terminates the execution of the LDA processing when a predetermined termination condition (second condition according to the embodiment of the present disclosure) is satisfied. In the present embodiment, when the lateral speed vy reaches the target value vyd described below, the termination condition is considered to be satisfied.

The ECU 10 acquires the width W and the cant C of the lane L1 based on the information acquired from the in-vehicle sensor 20 at the point in time when the LDA processing is started. Specifically, the ECU 10 acquires X coordinates (lateral positions) of lower end portions (end portions on the host vehicle side) of the lane marking BL and the lane marking BR in the image data from the camera 21. The ECU 10 calculates the width W of the lane L1 based on the information. The ECU 10 acquires the lateral acceleration ya from the acceleration sensor 23. The ECU 10 acquires the steering angle φ from the steering ECU and acquires a turning radius r based on the steering angle φ. The ECU 10 may acquire the turning radius r from a yaw rate sensor (not shown). The ECU 10 corrects the acceleration ya based on the turning radius r and the speed vs. That is, the ECU 10 removes an influence of the turning of the host vehicle on the acceleration ya. Then, the ECU 10 calculates the cant C based on the corrected acceleration ya.

Figure 4A:
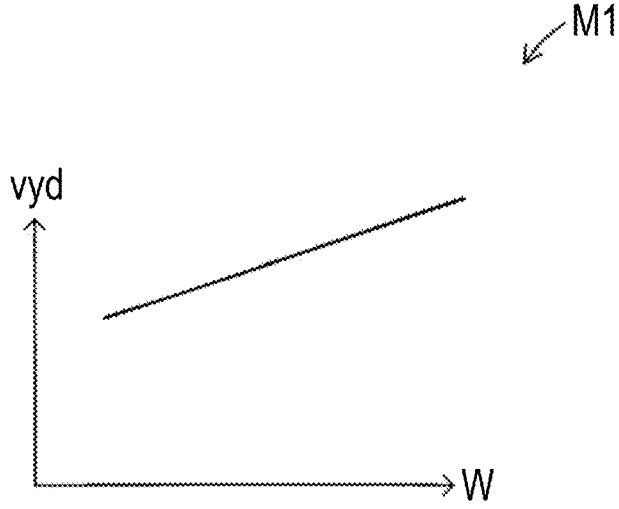
FIG. 4A is a map M1 in which a relationship between a width W of the lane and a target value vyd is defined.

Next, the ECU 10 sets the target value vyd based on the width W and the cant C. A map M1 (see FIG. 4A) in which a relationship between the width W and the target value vyd is defined is stored in the ROM 10*b*, and the ECU 10 acquires the target value vyd by referring to the map M1. The map M1 is designed such that the target value vyd is smaller as the width W is smaller.

Figure 4B:
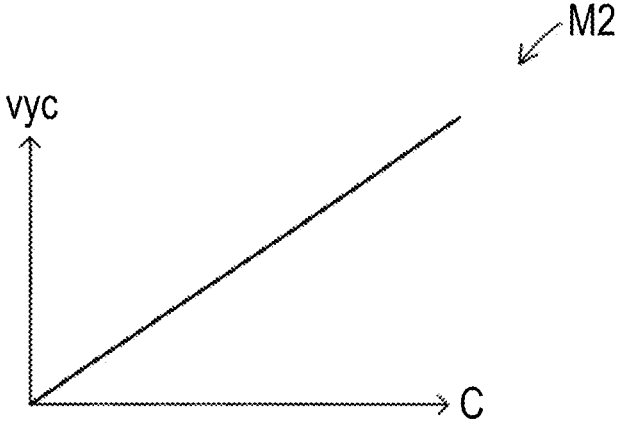
FIG. 4B is a map M2 in which a relationship between a cant C of the lane and a correction value vyc is defined.

Further, the ECU 10 corrects the target value vyd acquired as described above based on the cant C. Specifically, in the first situation, when a left end of the lane L1 is lower than a right end of the lane L1 (FIG. 2B), the ECU 10 adds a predetermined correction value vyc (>0) to the target value vyd. In the first situation, when the left end of the lane L1 is higher than the right end of the lane L1 (FIG. 2C), the ECU 10 subtracts the predetermined correction value vyc (>0) from the target value vyd. In the second situation, when the right end of the lane L1 is lower than the left end of the lane L1 (FIG. 3B), the ECU 10 adds the predetermined correction value vyc (>0) to the target value vyd. In the second situation, when the right end of the lane L1 is higher than the left end of the lane L1 (FIG. 3C), the ECU 10 subtracts the predetermined correction value vyc (>0) from the target value vyd. A map M2 (see FIG. 4B) in which a relationship between the cant C and the correction value vyc is defined is stored in the ROM 10*b*, and the ECU 10 decides the correction value vyc by referring to the map M2. The map M2 is designed such that the correction value vyc is larger as the cant C (height difference between the left end and the right end of the lane L1) is larger.

The ECU 10 sequentially acquires the speed vector vt of the host vehicle in the lane L1 during the execution of the LDA processing. Specifically, the ECU 10 sequentially calculates a traveling direction of the host vehicle in the lane L1 (angle γ between a straight line parallel to the width direction of the lane L1 and a straight line passing through a center portion of the host vehicle in the width direction) based on the information (position of the lane marking BL and the lane marking BR in the image and an extension direction thereof) acquired from the camera 21, and sequentially acquires the speed vs from the vehicle speed sensor 22. Then, the ECU 10 acquires a lateral component of the speed vector vt as the lateral speed vy (=vt×cos γ). The ECU 10 terminates the execution of the LDA processing when the lateral speed vy is increased and reaches the target value vyd (when the termination condition is satisfied) by the LDA processing.

Figure 5:
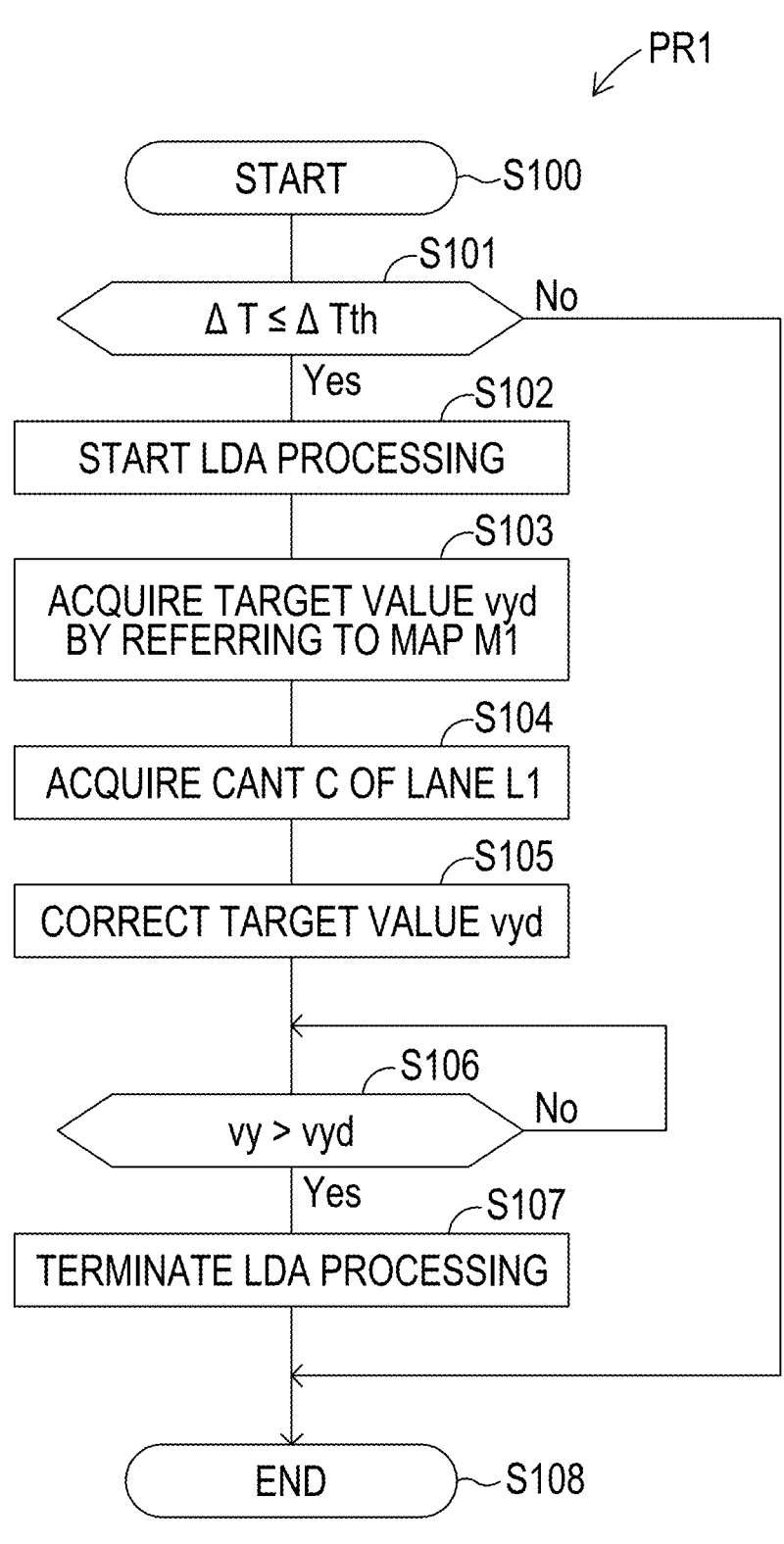
FIG. 5 is a flowchart of a program executed by a CPU to realize the lane departure suppression function.
Figure 6:
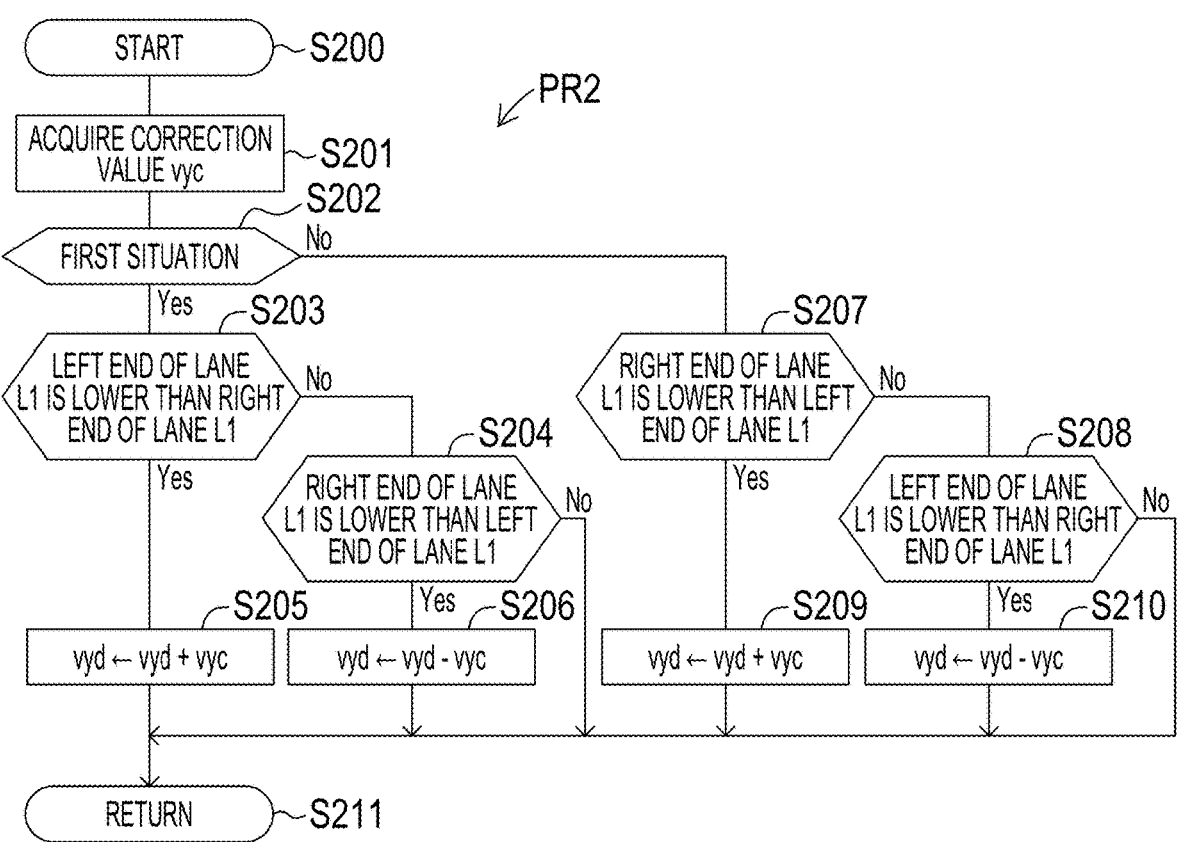
FIG. 6 is a flowchart of a program executed by the CPU to correct the target value vyd.

Next, a program PR1 (main routine (FIG. 5)) and a program PR2 (subroutine (FIG. 6)) that are executed by the CPU 10*a* (hereinafter, simply referred to as "CPU") of the ECU 10 to realize the lane departure suppression function described above will be described with reference to FIGS. 5 and 6.

Program PR1

The CPU starts the execution of the program PR1 at a predetermined cycle when the ignition switch is in the on state. The CPU starts the execution of the program PR1 from step S100 and advances the processing to step S101.

In step S101, the CPU acquires a predicted time ΔT for the host vehicle to depart from the lane L1, and determines whether or not the predicted time ΔT is equal to or smaller than the threshold value ΔTth. When the CPU determines that the predicted time ΔT is equal to or smaller than the threshold value ΔTth (S101: Yes), and advances the processing to step S102. On the other hand, when the CPU does not determine that the predicted time ΔT is equal to or smaller than the threshold value ΔTth (S101: No), the CPU advances the processing to step S108, and terminates the execution of the program PR1 in step S108.

In step S102, the CPU starts the LDA processing. Next, the CPU advances the processing to step S103.

In step S103, the CPU acquires the target value vyd of the lateral speed vy by referring to the map M1. Next, the CPU advances the processing to step S104.

In step S104, the CPU acquires the cant C of the lane L1 based on the information acquired from the in-vehicle sensor 20. Next, the CPU advances the processing to step S105.

In step S105, the CPU executes the program PR2 described below to correct the target value vyd.

In step S106, the CPU determines whether or not the lateral speed vy (measured value) exceeds the target value vyd. When the CPU determines that the lateral speed vy exceeds the target value vyd (S106: Yes), the CPU advances the processing to step S107. On the other hand, when the CPU does not determine that the lateral speed vy exceeds the target value vyd (S106: No), the CPU returns the processing to step S106. That is, the CPU continues the LDA processing until the lateral speed vy exceeds the target value vyd.

In step S107, the CPU terminates the execution of the LDA processing. Next, the CPU advances the processing to step S108, and terminates the execution of the program PR1 in step S108.

Program PR2

The CPU starts the execution of the program PR2 from step S200 and advances the processing to step S201. In step S201, the CPU acquires the correction value vyc by referring to the map M2. Next, the CPU advances the processing to step S202.

In step S202, the CPU determines whether or not the host vehicle is in a situation (first situation) in which there is a high possibility that the host vehicle departs from the left end of the lane L1. When the CPU determines that the first situation has occurred (S202: Yes), the CPU advances the processing to step S203. On the other hand, when the CPU does not determine that the first situation has occurred (S202: No), the CPU advances the processing to step S207.

In step S203, the CPU determines whether or not the left end of the lane L1 is lower than the right end of the lane L1 based on the information acquired from the in-vehicle sensor 20. When the CPU determines that the left end of the lane L1 is lower than the right end of the lane L1 (S203: Yes), the CPU advances the processing to step S205. On the other hand, when the CPU does not determine that the left end of the lane L1 is lower than the right end of the lane L1 (S203: No), the CPU advances the processing to step S204.

In step S204, the CPU determines whether or not the right end of the lane L1 is lower than the left end of the lane L1 based on the information acquired from the in-vehicle sensor 20. When the CPU determines that the right end of the lane L1 is lower than the left end of the lane L1 (S204: Yes), the CPU advances the processing to step S206. On the other hand, when the CPU does not determine that the right end of the lane L1 is lower than the left end of the lane L1 (S204: No), the CPU advances the processing to step S211, terminates the execution of the program PR2 in step S211, and advances the processing to step S106 of the program PR1.

In step S205, the CPU adopts a value obtained by adding the correction value vyc (value acquired from the map M2) to the target value vyd (value acquired from the map M1) as the target value vyd. Next, the CPU advances the processing to step S211, terminates the execution of the program PR2 in step S211, and advances the processing to step S106.

In step S206, the CPU adopts a value obtained by subtracting the correction value vyc (value acquired from the map M2) from the target value vyd (value acquired from the map M1) as the target value vyd. Next, the CPU advances the processing to step S211, terminates the execution of the program PR2 in step S211, and advances the processing to step S106.

In step S207, the CPU determines whether or not the right end of the lane L1 is lower than the left end of the lane L1 based on the information acquired from the in-vehicle sensor 20. When the CPU determines that the right end of the lane L1 is lower than the left end of the lane L1 (S207: Yes), the CPU advances the processing to step S209. On the other hand, when the CPU does not determine that the right end of the lane L1 is lower than the left end of the lane L1 (S207: No), the CPU advances the processing to step S208.

In step S208, the CPU determines whether or not the left end of the lane L1 is lower than the right end of the lane L1 based on the information acquired from the in-vehicle sensor 20. When the CPU determines that the left end of the lane L1 is lower than the right end of the lane L1 (S208: Yes), the CPU advances the processing to step S210. On the other hand, when the CPU does not determine that the left end of the lane L1 is lower than the right end of the lane L1 (S208: No), the CPU advances the processing to step S211, terminates the execution of the program PR2 in step S211, and advances the processing to step S106.

In step S209, the CPU adopts a value obtained by adding the correction value vyc (value acquired from the map M2) to the target value vyd (value acquired from the map M1) as the target value vyd. Next, the CPU advances the processing to step S211, terminates the execution of the program PR2 in step S211, and advances the processing to step S106.

In step S210, the CPU adopts a value obtained by subtracting the correction value vyc (value acquired from the map M2) from the target value vyd (value acquired from the map M1) as the target value vyd. Next, the CPU advances the processing to step S211, terminates the execution of the program PR2 in step S211, and advances the processing to step S106.

Effects

The ECU 10 of the lane departure suppression device 1 executes the lane departure suppression processing (alert processing P1 and automatic steering processing P2) of suppressing the departure when there is a high possibility that the host vehicle departs from the lane L1 (ΔT<ΔTth). As a result, the host vehicle starts to move toward the center side in the width direction of the lane L1. Then, the ECU 10 terminates the lane departure suppression processing when the predetermined termination condition is satisfied (when the lateral speed vy exceeds the target value vyd). Here, there is a possibility that the host vehicle departs (re-departs) from the lane L1 from one end or the other end of the lane L1 due to the influence of the width W and the cant C of the lane within a predetermined period of time (short period of time) after the lane departure suppression processing is terminated. According to the present embodiment, the ECU 10 decides the target value vyd in accordance with the width W and the cant C. As a result, the re-departure as described above is suppressed.

The present disclosure is not limited to the above-described embodiment, and various modification examples can be adopted within the scope of the present disclosure as described below.

Modification Example 1

In the above-described embodiment, the ECU 10 acquires the width W and the cant C of the lane L1 as the information about the traveling environment of the host vehicle, and decides the target value vyd based on these kinds of information. Instead of (or in addition to) this information, the ECU 10 may acquire information about a direction and strength of a crosswind, for example, and decide the target value vyd based on the information. Specifically, in the first situation (second situation), when the crosswind blows from a right side (left side) to a left side (right side), the ECU 10 may assign a larger value to the target value vyd as a wind speed is larger. On the contrary, in the first situation (second situation), in a case where the crosswind blows from the left side (right side) to the right side (left side), the ECU 10 may assign a smaller value to the target value vyd as the wind speed is larger.

Modification Example 2

In the above-described embodiment, the target value vyd acquired by referring to the map M1 is corrected by using the correction value vyc acquired by referring to the map M2, but the correction processing may be omitted.

What is claimed is:

1. A lane departure suppression device comprising:

an in-vehicle sensor configured to acquire information about a traveling environment of a host vehicle and information about a lateral position and a lateral speed of the host vehicle in a lane in which the host vehicle is traveling; and a processor configured to start lane departure suppression processing of controlling the host vehicle such that departure of the host vehicle from the lane is suppressed when a first condition for determining whether or not there is a high possibility that the host vehicle departs from one end in a width direction of the lane to an outside of the lane based on the information acquired by the in-vehicle sensor is satisfied, and then terminate execution of the lane departure suppression processing when a predetermined second condition is satisfied, wherein the processor is configured to set the second condition based on the information about the traveling environment such that re-departure of the host vehicle from the lane due to an influence of the traveling environment within a predetermined period of time after the lane departure suppression processing is terminated in a state where the host vehicle is moving toward a center side in the width direction of the lane due to the execution of the lane departure suppression processing is suppressed.

2. The lane departure suppression device according to claim 1, wherein:

the second condition is satisfied in a case where the lateral speed of the host vehicle when the host vehicle moves toward the center side of the lane exceeds a predetermined target value;

the information about the traveling environment includes information about a width of the lane; and the processor is configured to assign a smaller value to the target value as the width of the lane is smaller.

3. The lane departure suppression device according to claim 2, wherein:

the information about the traveling environment further includes information about a cant of the lane; and the processor is configured to add a larger correction value to the target value as a height difference when one end side of the lane is lower than the other end side of the lane is larger, and subtract a larger value from the target value as a height difference when the one end side of the lane is higher than the other end side of the lane is larger.

4. A lane departure suppression method comprising:

acquiring information about a traveling environment of a host vehicle and information about a lateral position and a lateral speed of the host vehicle in a lane in which the host vehicle is traveling; and executing vehicle control to start lane departure suppression processing of controlling the host vehicle such that departure of the host vehicle from the lane is suppressed when a first condition for determining whether or not there is a high possibility that the host vehicle departs from one end in a width direction of the lane to an outside of the lane based on the information acquired in the acquiring of the information is satisfied, and then terminate execution of the lane departure suppression processing when a predetermined second condition is satisfied, wherein the executing of the vehicle control includes setting the second condition based on the information about the traveling environment such that re-departure of the host vehicle from the lane due to an influence of the traveling environment within a predetermined period of time after the lane departure suppression processing is terminated in a state where the host vehicle is moving toward a center side in the width direction of the lane due to the execution of the lane departure suppression processing is suppressed.

5. A non-transitory storage medium storing a lane departure suppression program causing a computer provided in a host vehicle to execute:

acquiring information about a traveling environment of the host vehicle and information about a lateral position and a lateral speed of the host vehicle in a lane in which the host vehicle is traveling; and executing vehicle control to start lane departure suppression processing of controlling the host vehicle such that departure of the host vehicle from the lane is suppressed when a first condition for determining whether or not there is a high possibility that the host vehicle departs from one end in a width direction of the lane to an outside of the lane based on the information acquired in the acquiring of the information is satisfied, and then terminate execution of the lane departure suppression processing when a predetermined second condition is satisfied, wherein the executing of the vehicle control includes setting the second condition based on the information about the traveling environment such that re-departure of the host vehicle from the lane due to an influence of the traveling environment within a predetermined period of time after the lane departure suppression processing is terminated in a state where the host vehicle is moving toward a center side in the width direction of the lane due to the execution of the lane departure suppression processing is suppressed.

\* \* \* \* \*